US005775293A

United States Patent [19]

Kresse

[11] Patent Number: 5,775,293

[45] Date of Patent: Jul. 7, 1998

[54] ELECTRONIC THROTTLE PEDAL NONLINEAR FILTER

[75] Inventor: John P. Kresse, Shelbyville, Ind.

[73] Assignee: Cummins Engine Co., Inc., Columbus, Ind.

[21] Appl. No.: 722,750

[22] Filed: Oct. 1, 1996

[51] Int. Cl.[6] .............................. F02D 11/10; G06F 17/10

[52] U.S. Cl. .................. 123/396; 123/399; 364/724.014; 364/724.17; 364/724.19

[58] Field of Search .................................... 123/399, 396, 123/352-361; 364/724.014, 724.17, 724.19, 431.07; 701/110

[56] References Cited

U.S. PATENT DOCUMENTS

| | | | |
|---|---|---|---|
| 4,569,320 | 2/1986 | Collonia | 123/399 |
| 4,597,049 | 6/1986 | Murakami | 364/431.07 |
| 4,674,062 | 6/1987 | Premerlani | 364/724.19 |
| 4,677,560 | 6/1987 | Cao et al. | 364/431.08 |
| 4,860,210 | 8/1989 | McCombie | 364/426.04 |
| 4,872,104 | 10/1989 | Holsinger | 364/166 |
| 4,984,545 | 1/1991 | Kaneyasu et al. | 123/399 |
| 5,396,426 | 3/1995 | Hibino et al. | 364/426.04 |
| 5,429,089 | 7/1995 | Thornberg et al. | 123/352 |

*Primary Examiner*—Andrew M. Dolinar
*Attorney, Agent, or Firm*—Woodard, Emhardt, Naughton Moriarty & McNett

[57] ABSTRACT

An electronic throttle pedal nonlinear filter. During throttle control of a vehicle's all speed governor, a nonlinear prefilter is used to modify the reference command. This prefilter can be used to heavily filter small throttle corrections, while allowing large throttle changes to have little or no filtering. By heavily filtering small throttle corrections, throttle sensitivity can be reduced, helping the throttle "feel" when driving over bumpy roads or when making small throttle changes. Little filtering when making large throttle changes helps to give a fast governor response when a large acceleration or deceleration is desired. The filter works by comparing the past value of the all speed governor reference speed (or throttle position) to a rate limited value of the current reference speed (or throttle position). This difference is used to look up a filter coefficient in a table. This coefficient is used in a conventional first-order digital lag filter to produce the filter output. The table can be calibrated such that if the difference was small (a small change in throttle position), a large filter coefficient (large time constant) can be selected. If the difference was large (a big change in throttle position), a small filter coefficient (or none at all) can be used to lightly filter the throttle.

19 Claims, 2 Drawing Sheets

ELECTRONIC THROTTLE PEDAL NONLINEAR FILTER

TECHNICAL FIELD OF THE INVENTION

The present invention generally relates to electronic signal filters and, more particularly, to an electronic throttle pedal nonlinear filter.

BACKGROUND OF THE INVENTION

In nearly all vehicles, the velocity and acceleration of the vehicle is controlled by the position of a throttle pedal operated by the driver's foot, and by the rate of change of this throttle pedal position. In certain vehicles, particularly in those with electronically controlled diesel engines, the exhibited throttle pedal response is too sensitive during small throttle pedal changes. This throttle sensitivity problem is particularly pronounced in vehicles with high horsepower-to-weight ratios (e.g. pick-up trucks), but can also be a problem for large vehicles when driving over rough roads. Generally, it is undesirable for a small change in throttle pedal position to result in a large change in vehicle speed or acceleration. For example, a driver wishing to increase the vehicle speed slightly will depress the accelerator pedal slightly, and will be startled if the engine produces a large amount of acceleration. This will cause the driver to immediately back off of the throttle pedal, which in turn slows the vehicle down too much. The driver then depresses the throttle pedal and the cycle repeats endlessly. This problem is known as "driver-induced oscillation". Similarly, while driving over rough roads, the motion imparted to the vehicle by the rough driving surface may cause the driver to unintentionally depress the accelerator pedal by a small amount. Under these circumstances, it would be undesirable for the velocity and/or acceleration of the vehicle to increase dramatically.

The above situations are annoying to the vehicle driver and, at worst, may inhibit maintaining control over the vehicle. Such throttle sensitivity has been alleviated in the prior art by a linear (e.g. software) lag filter on the throttle pedal signal. However, by incorporating a filter with a time constant large enough to reduce throttle sensitivity during small changes in throttle pedal position, a separate problem is often created in producing a throttle pedal response which is too slow when a large throttle change is requested by the driver. This in turn can be dangerous in preventing the driver from accelerating or decelerating quickly in order to avoid a dangerous situation. There is therefore a need for a system which reduces throttle pedal sensitivity when small throttle changes are requested by the driver, but which also provides a high degree of sensitivity when large changes in throttle are requested by the driver. The present invention is directed toward meeting this need.

SUMMARY OF THE INVENTION

Figure 1:
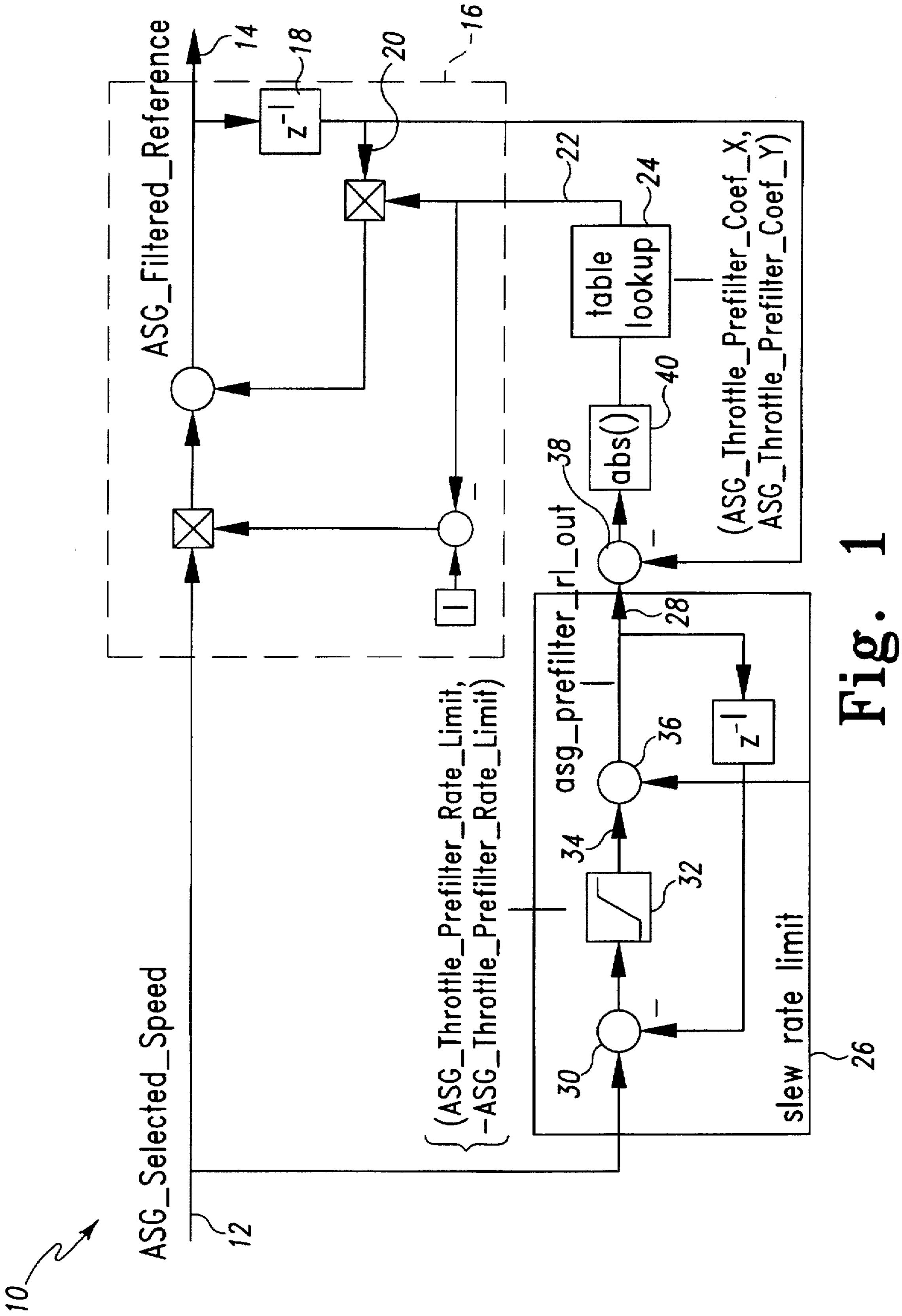
FIG. 1 is a schematic block diagram of a preferred embodiment filter of the present invention.

The present invention relates to an electronic throttle pedal nonlinear filter. During throttle control of a vehicle's all speed governor, a nonlinear prefilter is used to modify the reference command. This prefilter can be used to heavily filter small throttle corrections, while allowing large throttle changes to have little or no filtering. By heavily filtering small throttle corrections, throttle sensitivity can be reduced, helping the throttle "feel" when driving over bumpy roads or when making small throttle changes. Little filtering when making large throttle changes helps to give a fast governor response when a large acceleration or deceleration is desired. The filter works by comparing the past value of the all speed governor reference speed (or throttle position) to a rate limited value of the current reference speed (or throttle position). This difference is used to look up a filter coefficient in a table. This coefficient is used in a conventional first-order digital lag filter to produce the filter output. The table can be calibrated such that if the difference was small (a small change in throttle position), a large filter coefficient (large time constant) can be selected. If the difference was large (a big change in throttle position), a small filter coefficient (or none at all) can be used to lightly filter the throttle.

In one form of the invention, a method for nonlinearly filtering an electronic input signal in order to produce a filtered output signal is disclosed, comprising the steps of: a) receiving the input signal; b) creating a slew rate limited signal that tracks the input signal, wherein the slew rate limited signal is limited in a rate at which its value can change; c) subtracting a past value of the output signal from the slew rate limited signal in order to create a difference signal; d) creating a table index signal by taking the absolute value of the difference signal; e) applying the table index signal to a look-up table in order to generate filter coefficients; and f) applying the input signal and the filter coefficients to a lag filter in order to generate the filtered output signal.

In another form of the invention, a method for nonlinearly filtering an electronic input signal in order to produce a filtered output signal is disclosed, comprising the steps of: a) receiving the input signal; b) detecting any change in the input signal and a magnitude of the change; and c) filtering the input signal in order to produce the output signal, wherein said filtering exhibits a large time constant when the magnitude is small and a small time constant when the magnitude is large.

In another form of the invention, an electronic filter for nonlinearly filtering an electronic input signal in order to produce a filtered output signal is disclosed, comprising: means for receiving the input signal; means for creating a slew rate limited signal that tracks the input signal, wherein the slew rate limited signal is limited in a rate at which its value can change; means for subtracting a past value of the output signal from the slew rate limited signal in order to create a difference signal; means for creating a table index signal by taking the absolute value of the difference signal; means for applying the table index signal to a look-up table in order to generate filter coefficients; and means for applying the input signal and the filter coefficients to a lag filter in order to generate the filtered output signal.

In another form of the invention, an electronic filter for nonlinearly filtering an electronic input signal in order to produce a filtered output signal is disclosed, comprising: means for receiving the input signal; means for detecting any change in the input signal and a magnitude of the change; and means for filtering the input signal in order to produce the output signal, wherein said filtering exhibits a large time constant when the magnitude is small and a small time constant when the magnitude is large.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a schematic block diagram of a preferred embodiment digital filter of the present invention is illustrated and indicated generally at 10. The input to the filter 10 is a signal 12 labelled as the all speed governor selected speed. The filter input 12 is linearly related to the vehicle throttle position, such as by applying a scaler and an offset to the actual throttle position. The filter output 14 is labelled all speed governor filtered reference and comprises the throttle pedal input to the vehicle engine's electronic all speed governor. The filter 10 includes a first-order digital lag filter 16 from which the filter output 14 is produced. The digital lag filter has three inputs: the all speed governor selected speed filter input 12; the filter output 14 which is input to a feedback loop that passes through the delay element 18 in order to create a past value of the all speed governor reference speed 14 at 20; and a third input 22 provided by a look up table 24. Selection of the value from the look up table 24 is described in greater detail hereinbelow.

In order to determine the coefficient to be selected from the look up table 24 for application to the digital lag filter 16, the all speed governor selected speed 12 is applied to a slew rate limit prefilter 26. As is known in the art, the slew rate limit prefilter 26 operates by producing an output 28 that tracks the filter input 12, with the exception that the rate of change of the prefilter output 28 is limited. This is accomplished by determining the difference between the prefilter output 28 and the filter input 12 at the summation block 30 and then applying this difference to the position limit function block 32, which will produce an output 34 that is equal to this difference so long as this difference is between predetermined positive and negative boundary limits. If the difference is outside of these limits, then the output 34 is set equal to the closest such limit. This position limited difference signal 34 is then added back to the past value of the prefilter output 28 at summation block 36 in order to generate the current prefilter output 28. The result is that the prefilter output 28 tracks the filter input 12, with the limitation that the prefilter output 28 can only change at a limited rpm/second rate. In a preferred embodiment to the present invention, the rate of change of the prefilter output 28 is limited to +/−300 rpm/second.

The prefilter output 28 is applied to summation block 38 which subtracts the previous value of the all speed governor filtered reference speed 14 therefrom. The absolute value of this difference is then obtained by the function block 40. The summation block 38 and absolute value function 40 operate to detect how much change has occurred in the filter input 12 as compared to the filtered reference output 14. The output of the absolute value function block 40 is therefore directly related to the change in the position of the throttle pedal. It is this value that is applied to the look up table 24 in order to generate the filter coefficients that are applied to the digital lag filter 16 via the input 22. If the output of absolute value function block 40 indicates a small difference, then a large filter time constant is produced by the look up table 24. The result is that for small changes in the throttle pedal position, the filter input 12 is heavily filtered in order to arrive at the filtered reference output 14 (i.e. the output 14 heavily relies on the old value of the filtered reference output 14). Conversely, if the output of the absolute value function block 40 indicates a large difference in the throttle position, a small filter time constant (or a zero filter time constant) is produced in order to very lightly filter the throttle input 12 (or to not filter it at all).

Figure 2:
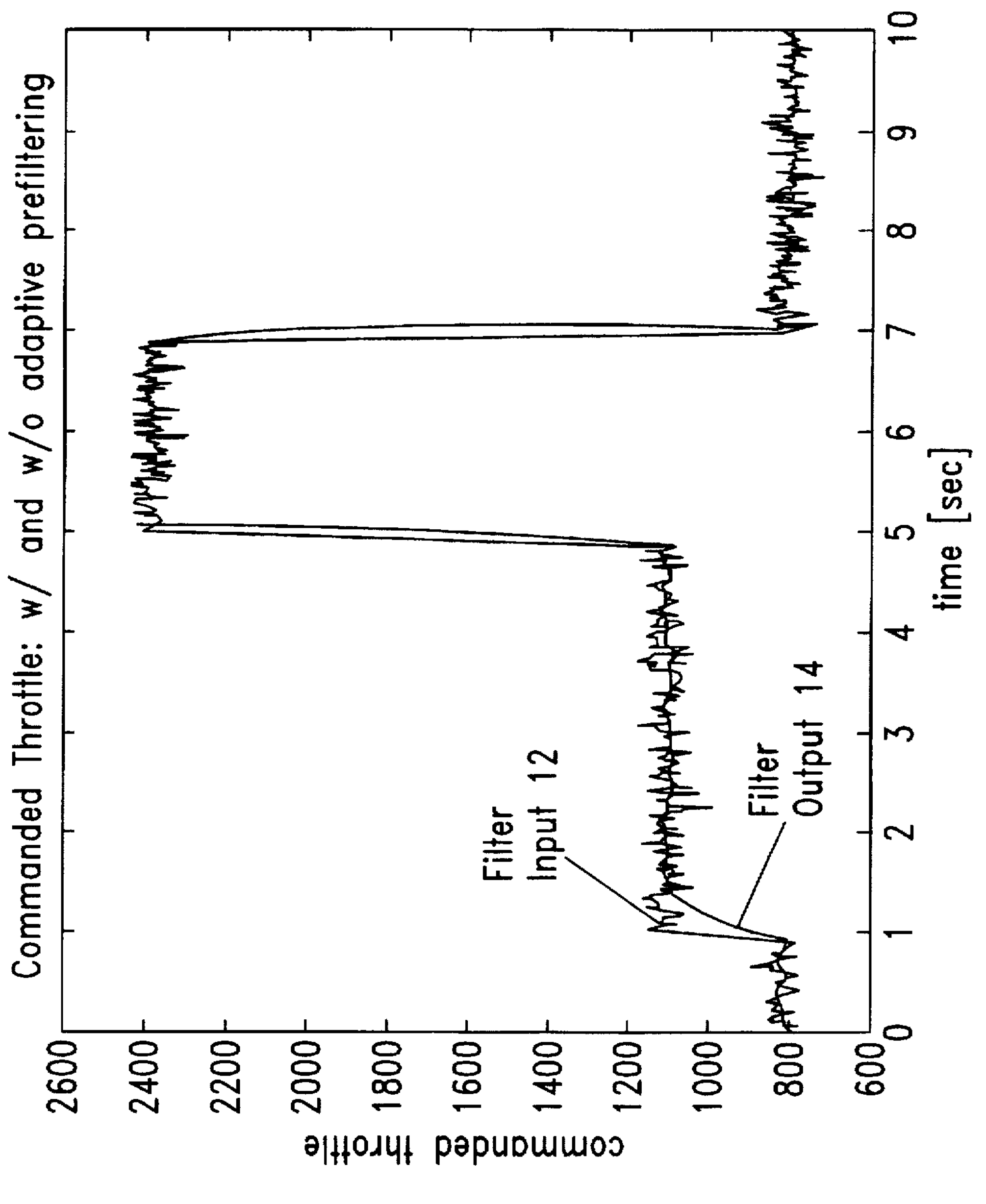
FIG. 2 is a graph of commanded throttle vs. time, illustrating a comparison between the commanded throttle with and without filtering provided by the present invention.

In the preferred embodiment of the present invention, the filter 10 of FIG. 1 is implemented as a software routine which is iterated at a rate of 50 Hz (once every 20 milliseconds). FIG. 2 is a graph showing a comparison of the commanded throttle (in RPM) vs. time, illustrating the effect of applying the filter 10 of FIG. 1 to the commanded throttle signal. For a small change in commanded throttle, such as that in the neighborhood of the one-second time mark, the commanded throttle at the filter input 12 changes almost instantaneously. The commanded throttle at the filter output 14, however, is heavily filtered and exhibits a delay of approximately 0.4 seconds before reaching the new throttle value. However, when large changes in commanded throttle are encountered (such as at the 5 and 7 second marks), the filter output 14 very closely tracks the filter input 12, indicating that the commanded throttle signal has been very lightly filtered. It will be further appreciated by those skilled in the art that the low level noise surrounding steady state commanded throttle positions is also greatly filtered by the filter 10. The filter of the present invention therefore solves the prior art throttle sensitivity problem by automatically applying heavy filtering (a large time constant) to the commanded throttle signal when changes in this signal are relatively small. At the same time, the response of the filter of the present invention to large changes in commanded throttle is very fast (a very small time constant or none at all).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for nonlinearly filtering an electronic input signal in order to produce a filtered output signal, comprising the steps of:

a) receiving the input signal;

b) creating a slew rate limited signal that tracks the input signal, wherein the slew rate limited signal is limited in a rate at which its value can change;

c) subtracting a past value of the output signal from the slew rate limited signal in order to create a difference signal;

d) creating a table index signal by taking the absolute value of the difference signal;

e) applying the table index signal to a look-up table in order to generate filter coefficients; and f) applying the input signal and the filter coefficients to a lag filter in order to generate the filtered output signal.

2. The method of claim 1, wherein the input signal is proportional to a throttle pedal position of a vehicle.

3. The method of claim 2, wherein the output signal is applied to an engine all speed governor of the vehicle.

4. The method of claim 1, wherein the lag filter is a digital first order lag filter.

5. The method of claim 1, wherein the filter coefficients produce a large time constant in the lag filter when the input signal changes by a small amount and a small time constant when the input signal changes by a large amount.

6. The method of claim 5, wherein the small time constant is a zero time constant.

7. A method for nonlinearly filtering an electronic input signal in order to produce a filtered output signal, comprising the steps of:

a) receiving the input signal;

b) detecting any change in the input signal and a magnitude of the change; and c) filtering the input signal in order to produce the output signal by applying the input signal to a digital first order lag filter, wherein said filtering exhibits a large time constant when the magnitude is small and a small time constant when the magnitude is large.

8. The method of claim 7, wherein the small time constant is a zero time constant.

9. The method of claim 7, wherein step (b) comprises:

(b.1) creating a slew rate limited signal that tracks the input signal, wherein the slew rate limited signal is limited in a rate at which its value can change; and (b.2) subtracting a past value of the output signal from the slew rate limited signal in order to determine the magnitude of the change.

10. A method for nonlinearly filtering an electronic input signal in order to produce a filtered output signal, comprising the steps of:

a) receiving the input signal;

b) detecting any change in the input signal and a magnitude of the change; and c) filtering the input signal in order to produce the output signal, wherein said filtering exhibits a large time constant when the magnitude is small and a small time constant when the magnitude is large;

wherein the input signal is proportional to a throttle pedal position of a vehicle.

11. A method for nonlinearly filtering an electronic input signal in order to produce a filtered output signal, comprising the steps of:

a) receiving the input signal;

b) detecting any change in the input signal and a magnitude of the change; and c) filtering the input signal in order to produce the output signal, wherein said filtering exhibits a large time constant when the magnitude is small and a small time constant when the magnitude is large;

wherein the small time constant is a zero time constant; wherein the input signal is applied to an engine all speed governor of the vehicle.

12. An electronic filter for nonlinearly filtering an electronic input signal in order to produce a filtered output signal, comprising:

means for receiving the input signal;

means for creating a slew rate limited signal that tracks the input signal, wherein the slew rate limited signal is limited in a rate at which its value can change;

means for subtracting a past value of the output signal from the slew rate limited signal in order to create a difference signal;

means for creating a table index signal by taking the absolute value of the difference signal;

means for applying the table index signal to a look-up table in order to generate filter coefficients; and means for applying the input signal and the filter coefficients to a lag filter in order to generate the filtered output signal.

13. The filter of claim 12, wherein the input signal is proportional to a throttle pedal position of a vehicle.

14. The method of claim 13, wherein the output signal is applied to an engine all speed governor of the vehicle.

15. The method of claim 12, wherein the lag filter is a digital first order lag filter.

16. The method of claim 12, wherein the filter coefficients produce a large time constant in the lag filter when the input signal changes by a small amount and a small time constant when the input signal changes by a large amount.

17. The method of claim 16, wherein the small time constant is a zero time constant.

18. An electronic filter for nonlinearly filtering an electronic input signal in order to produce a filtered output signal, comprising:

means for receiving the input signal;

means for detecting any change in the input signal and a magnitude of the change; and a digital first order lag filter for filtering the input signal in order to produce the output signal, wherein said filtering exhibits a large time constant when the magnitude is small and a small time constant when the magnitude is large.

19. The filter of claim 18, wherein the small time constant is a zero time constant.

* * * * *